May 3, 1932. A. O. HURXTHAL 1,857,025
THERMOSTATIC ELEMENT
Original Filed Feb. 24, 1928
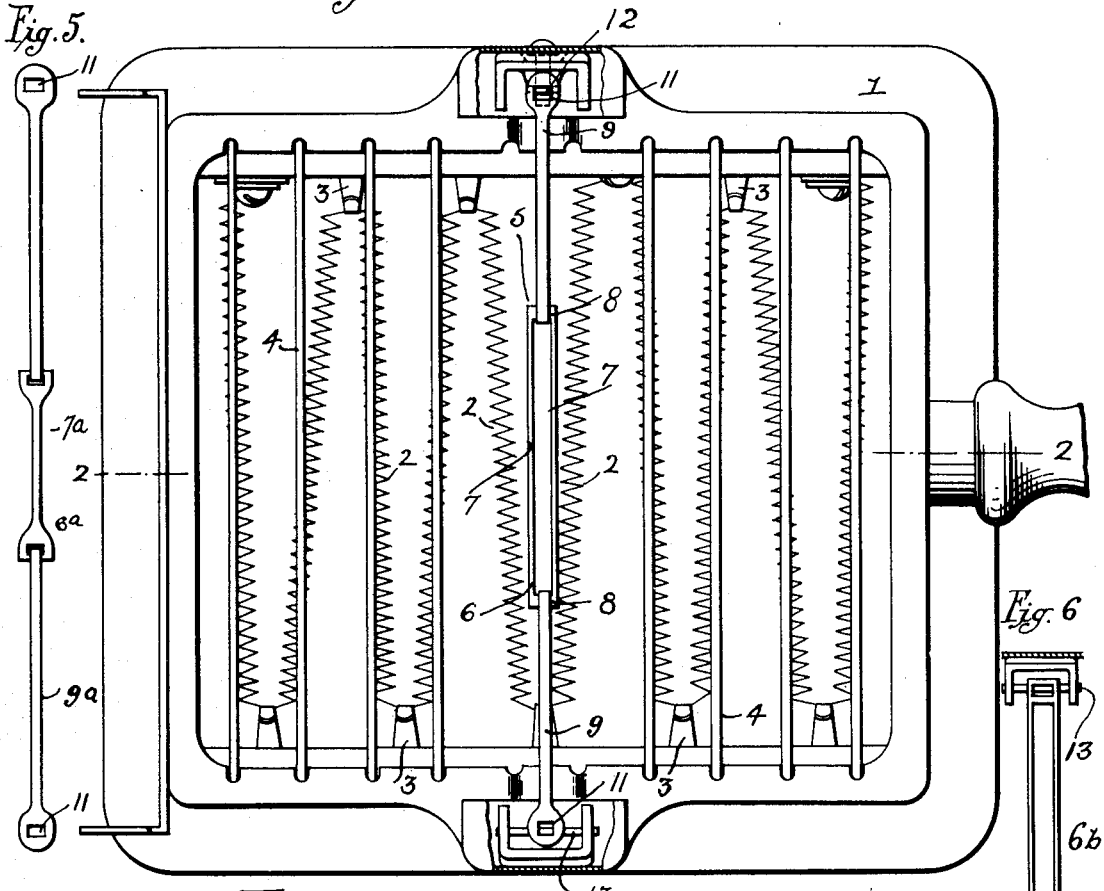
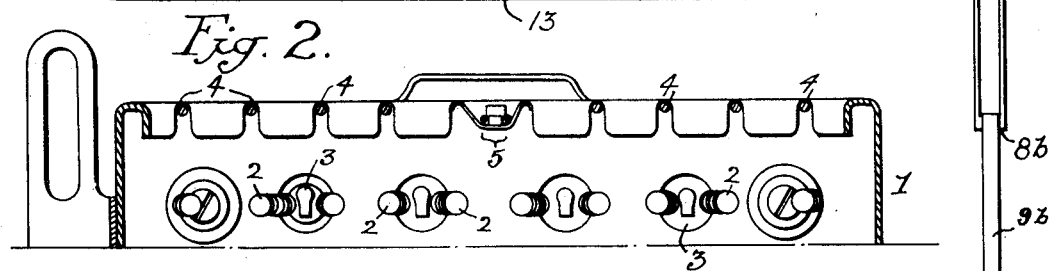
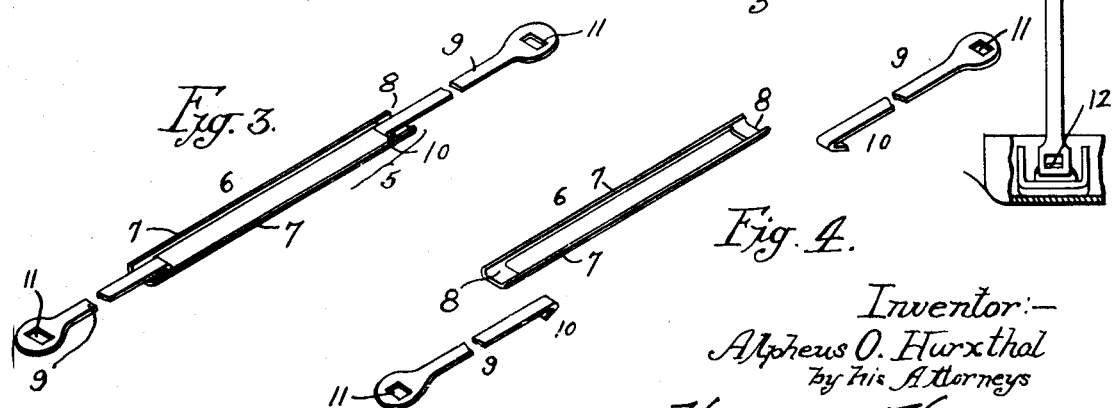
Inventor:—
Alpheus O. Hurxthal
by his Attorneys
Howson + Howson Patented May 3, 1932

1,857,025

UNITED STATES PATENT OFFICE

ALPHEUS O. HURXTHAL, OF PHILADELPHIA, PENNSYLVANIA, ASSIGNOR TO PROCTOR & SCHWARTZ ELECTRIC COMPANY, OF PHILADELPHIA, PENNSYLVANIA, A CORPORATION OF PENNSYLVANIA

THERMOSTATIC ELEMENT

Original application filed February 24, 1928, Serial No. 256,648. Divided and this application filed January 7, 1930. Serial No. 419,117.

This application is a division of my co-pending application, Serial No. 256,648, filed Feb. 24, 1928.

This invention relates to certain improvements in thermostatic elements used on automatic toasters and like cooking devices.

The object of my invention is to provide a thermostatic element, adapted to extend across a toaster or like cooking utensil, which is made in sections, the central expansive section being comparatively short, so that material being toasted will cover the entire expansive section, insuring the proper toasting of the slice of bread.

Where the expansive element is longer than the bread is wide, then that portion of the expansive element not covered by the bread heats up more quickly than the other portion, and, consequently, will actuate the automatic switch before the bread has been thoroughly toasted.

In the accompanying drawings:

Figure 1 is a plan view of a toaster illustrating my invention, the upper section of the toaster being detached;

Fig. 2 is a sectional view on the line 2—2 of Fig. 1;

Fig. 3 is a perspective view of the thermostatic element;

Fig. 4 is a detached perspective view of the thermostatic element; and

Figs. 5 and 6 are views illustrating a modification of the invention.

In the drawings, 1 is the frame of the toaster which may be of any form desired.

Heating elements 2 are mounted on hooks 3 in the present instance, projecting from the sides of the frame 1. These heating elements are connected to the terminals leading from the sockets which receive the plugs of the ordinary type.

Located above the heating elements 2 in the present instance are cross-bars 4 which are spaced a given distance apart and which support the bread to be toasted.

Extending from one side of the toaster to the other is the thermostatic element 5, which is made in three sections in the present instance, as shown in Fig. 3.

The central section 6 is the expansive section and consists of two longitudinal bars 7—7 connected by a cross-piece 8 at each end, and end members 9 which have hooks 10. These hooks engage the cross-bars 8 of the central member 6. The end members are perforated at 11 to engage the adjusting means 12 at one end and the connection 13, which actuates the trip mechanism of the toaster.

This invention is an improvement upon the thermostatic element described in the patent granted to me on the 2nd day of June, 1925, No. 1,540,628, thereby making it unnecessary to describe, in detail, the mechanism which actuates the alarm and shuts off the current.

The central section of the thermostatic element is made of a high expansive metal, while the end pieces 9—9 are made of low expansive metal or other material. If made of metal, such material as nickel steel may be used, or porcelain, or quartz.

It will be noticed that the central expansive section 6 of the thermostatic element is much less in length than the width of the toaster. A small slice of bread will cover the entire expansive element, insuring the proper toasting of the bread, regardless of whether it is small or large.

In Fig. 5, I have illustrated a modification, in which the element 6a is in the shape of a single bar 7a and is much shorter than the central element in Fig. 1.

In Fig. 6, I have illustrated a modification, showing the thermostatic element made in two sections 6b and 9b. In this instance the bread to be toasted would be placed over the high expansive section of the element at one side of the toaster.

It will be understood that the expansive element may be of any length and of any shape, providing it is of such length that a comparatively small piece of toast or other material to be toasted or cooked will cover said expansive section.

I claim:

The combination of a toaster having means for supporting the toast and heating elements located back of the said means; and a thermostatic element extending from one side of the toaster to the other and in position close to the bread being toasted, and having a comparatively short section of expansible metal interposed between relatively non-expansible sections and so arranged that the said expansible section will be completely covered by the bread or other material being toasted.

ALPHEUS O. HURXTHAL.